(12) United States Patent
Watanabe

(10) Patent No.: US 11,906,266 B2
(45) Date of Patent: Feb. 20, 2024

(54) PROPELLING DEVICE

(71) Applicant: WEL RESEARCH CO., LTD., Ichihara (JP)

(72) Inventor: Kazuki Watanabe, Ichihara (JP)

(73) Assignee: WEL RESEARCH Co., Ltd, Ichihara (JP)

( * ) Notice: Subject to any disclaimer, the term of this patent is extended or adjusted under 35 U.S.C. 154(b) by 110 days.

(21) Appl. No.: 17/294,629

(22) PCT Filed: Oct. 21, 2019

(86) PCT No.: PCT/JP2019/041402
§ 371 (c)(1),
(2) Date: Mar. 17, 2022

(87) PCT Pub. No.: WO2020/085337
PCT Pub. Date: Apr. 30, 2020

(65) Prior Publication Data
US 2022/0236033 A1 Jul. 28, 2022

(30) Foreign Application Priority Data

Oct. 23, 2018 (JP) ................................. 2018-199601

(51) Int. Cl.
*F03G 7/06* (2006.01)
*F41F 7/00* (2006.01)

(52) U.S. Cl.
CPC .............. *F41F 7/00* (2013.01); *F03G 7/0614* (2021.08)

(58) Field of Classification Search
None
See application file for complete search history.

(56) References Cited

U.S. PATENT DOCUMENTS

| 5,245,738 | A | 9/1993 | Johnson |
| 7,422,403 | B1 * | 9/2008 | Johnson ................. F16B 35/00 411/DIG. 2 |

(Continued)

FOREIGN PATENT DOCUMENTS

| CN | 108240377 A | 7/2018 |
| CN | 108382609 A | 8/2018 |

(Continued)

OTHER PUBLICATIONS

International Search Report and Written Opinion; International Patent Application No. PCT/JP2019/041402, dated Jan. 21, 2020 with English translation (13 pages).

(Continued)

*Primary Examiner* — Shafiq Mian
(74) *Attorney, Agent, or Firm* — Maine Cernota & Curran

(57) ABSTRACT

A propelling device is provided that is excellent in safety during storage and securely propels a propelling section during operation. A propelling device includes: a fixed section; a propelling section; a shape memory alloy placed between the fixed section and the propelling section; and a coupling member coupling the fixed section, the propelling section, and the shape memory alloy with each other, wherein the shape memory alloy is in a state of a compressed martensite phase, and the shape memory alloy is transformed from the state of the martensite phase to a state of an austenite phase, causing strain energy to be stored, and action of the strain energy is used to break at least part of the coupling member and also impart a propelling force to the propelling section, and action of the propelling force causes the propelling section to be propelled in a direction away from the fixed section.

5 Claims, 3 Drawing Sheets

(56) References Cited

U.S. PATENT DOCUMENTS

| | | | |
|---|---|---|---|
| 9,611,838 B2* | 4/2017 | Koehler | F03G 7/065 |
| 2011/0232278 A1* | 9/2011 | Lyman | F03G 7/065 |
| | | | 60/527 |
| 2017/0152906 A1* | 6/2017 | Watanabe | F16F 1/021 |

FOREIGN PATENT DOCUMENTS

| | | |
|---|---|---|
| JP | 2004-230929 A | 8/2004 |
| JP | 2018-159492 A | 10/2018 |
| WO | 2016/013054 A1 | 1/2016 |

OTHER PUBLICATIONS

European Search Report for Patent Application No. 19876357.5 dated Jun. 28, 2022, 7 pages.

* cited by examiner

PROPELLING DEVICE

TECHNICAL FIELD

The present invention relates to a propelling device.

BACKGROUND ART

As a method of propelling a propelling section, such as a bullet and an arrow, there are, for example, a method using explosive power of a bursting explosive as described in PTL 1 and a method using elastic energy of an elastic material, such as a spring, as described in PTL 2.

CITATION LIST

Patent Literature

PTL 1: JP 2018-159492 A
PTL 2: JP 2004-230929 A

SUMMARY OF INVENTION

Technical Problem

However, the method using explosive power of a bursting explosive and the like has a possibility of unintentionally initiating the bursting explosive, causing a safety problem. In the method using elastic energy, the elastic force is constantly applied from the elastic material and there is a risk of unintentionally propelling a propelling section due to detachment of a stopper to inhibit release of the elastic material and the like.

It is an object of the present invention to provide a propelling device that is excellent in safety during storage and securely propels a propelling section during operation.

Solution to Problem

To solve the above problems, an aspect of the present invention provides a propelling device including: a fixed section; a propelling section; a shape memory alloy placed between the fixed section and the propelling section; and a coupling member coupling the fixed section, the propelling section, and the shape memory alloy with each other, wherein the shape memory alloy is in a state of a compressed martensite phase, and the shape memory alloy is transformed from the state of the martensite phase to a state of an austenite phase, causing strain energy to be stored, and action of the strain energy is used to break at least part of the coupling member and also impart a propelling force to the propelling section, and action of the propelling force causes the propelling section to be propelled in a direction away from the fixed section.

The coupling member may have a notched portion in an indent or recess shape. The shape memory alloy may have a cylindrical shape with a bush, the coupling member may be a notched bolt having the notched portion, the fixed section may have an internal thread screwed to the notched bolt, the notched bolt may have a head engaged with the propelling section, the notched bolt may have a threaded portion screwed to the internal thread of the fixed section through the bush of the shape memory alloy, and the notched bolt may be fastened to couple the fixed section, the propelling section, and the shape memory alloy with each other.

The shape memory alloy may be a single crystal shape memory alloy. The single crystal shape memory alloy is a Cu—Al—Ni single crystal shape memory alloy.

It should be noted that Summary of Invention above does not list all the characteristics essential to the present invention. In addition, sub-combinations of these characterizing groups may also constitute the invention.

DESCRIPTION OF EMBODIMENTS

The present invention is described below with embodiments of the present invention while the embodiments below do not limit the invention according to the scope of the claims. In addition, not all combinations of the characteristics described in the embodiments have to be essential for the means of solution of the invention.

Figure 1:
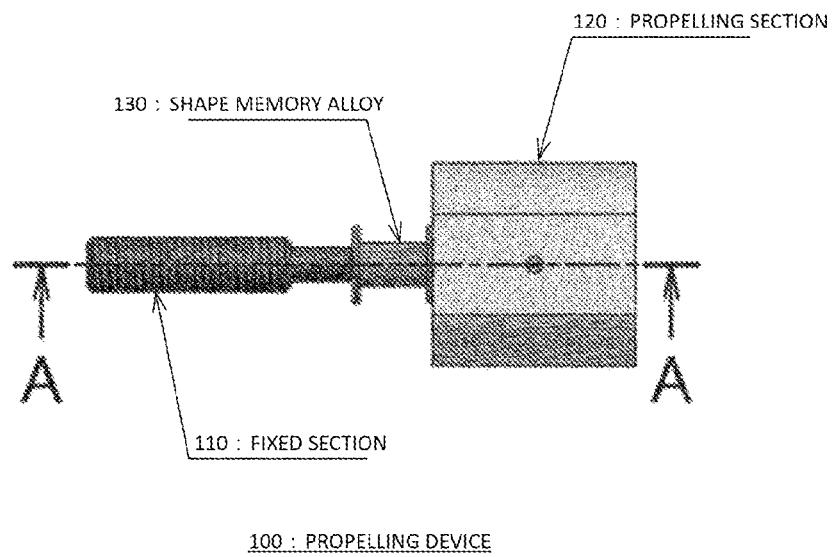
FIG. 1 is a top view of a propelling device 100 as an embodiment of the present invention.
Figure 2:
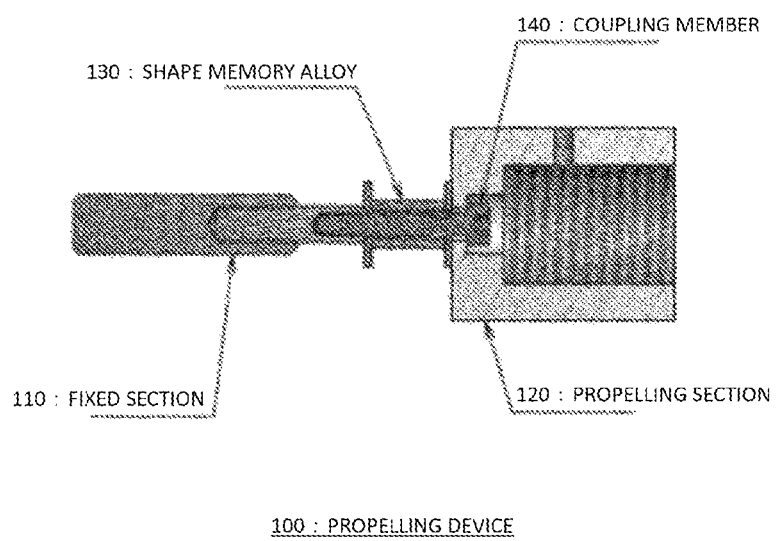
FIG. 2 is a cross-sectional view taken along line A-A in FIG. 1.

FIG. 1 is a top view of a propelling device 100 as an embodiment of the present invention, and FIG. 2 is a cross-sectional view taken along line A-A in FIG. 1. The propelling device 100 in the present embodiment has a fixed section 110, a propelling section 120, a shape memory alloy 130, and a coupling member 140.

The fixed section 110 is fixed to a mass not to be moved by reaction of propelling the propelling section 120. The fixed section 110 itself may configure the mass. A connection mechanism between the fixed section 110 and the mass is exemplified by screwing in this description while it is arbitrary. For example, it may be welding, clamping, and the like.

The propelling section 120 is a member to be propelled from the propelling device 100. Together with the shape memory alloy 130, the propelling section 120 is coupled to the fixed section 110 by the coupling member 140. The material for the propelling section 120 is arbitrary as long as it has mechanical strength to allow coupling by the coupling member 140. For example, it may be exemplified by metal, such as iron and stainless steel, ceramic, rigid plastics, and the like.

The shape memory alloy 130 is placed between the fixed section 110 and the propelling section 120 and is coupled, together with the propelling section 120, to the fixed section 110 by the coupling member 140. The shape memory alloy 130 is in a state of a compressed martensite phase.

The coupling member 140 couples the fixed section 110, the propelling section 120, and the shape memory alloy 130 with each other. The coupling member 140 may have a notched portion, such as an indent and a recess. When the coupling member 140 has the notched portion, it is possible to focus breaking of the coupling member 140 during operation on the notched portion to control the breaking and stabilize propelling of the propelling section 120.

Figure 3:
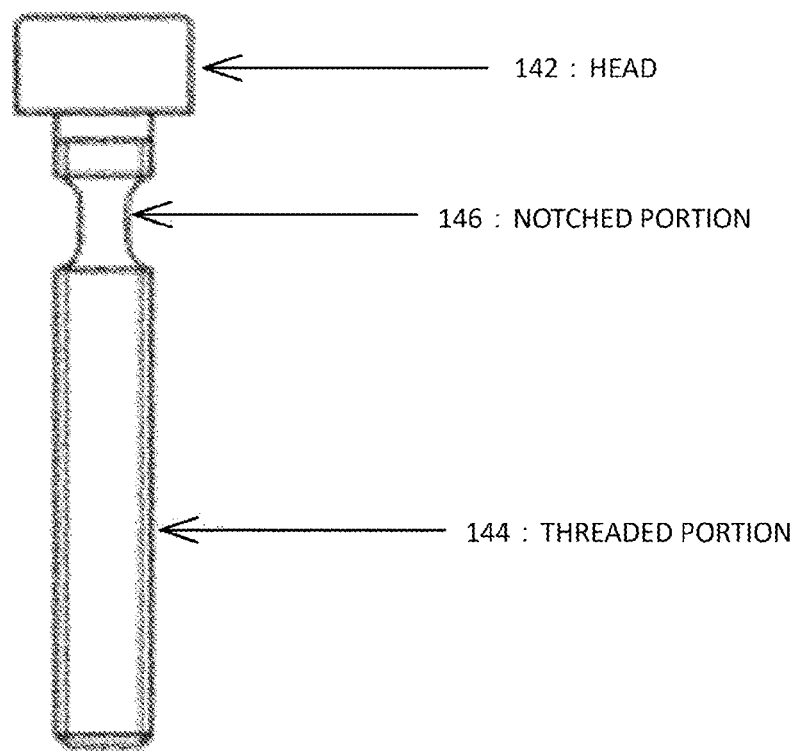
FIG. 3 is a side view illustrating details of a notched bolt shown as an example of a coupling member 140.

FIG. 3 is a side view illustrating details of a notched bolt shown as an example of the coupling member 140. The notched bolt (coupling member 140) illustrated in FIG. 3 has a head 142, a threaded portion 144, and a notched portion 146. As described above, when the notched bolt is broken, the breaking occurs in the notched portion 146.

When the notched bolt in FIG. 3 is used as the coupling member 140, the shape memory alloy 130 has a cylindrical shape with a bush, the fixed section 110 has an internal thread formed to be screwed to the notched bolt, the head 142 of the notched bolt is engaged with the propelling section 120, the threaded portion 144 of the notched bolt is screwed to the internal thread of the fixed section 110 through the bush of the shape memory alloy 130, and thus the notched bolt is fastened to allow coupling of the fixed section 110, the propelling section 120, and the shape memory alloy 130 with each other.

In the propelling device 100 thus configured, the shape memory alloy 130 is transformed from the state of the martensite phase to a state of an austenite phase, causing strain energy to be stored, and action of the strain energy is used to allow breaking of at least part of the coupling member 140, for example the notched portion 146. This allows impartation of a propelling force to the propelling section 120, and action of the propelling force causes the propelling section 120 to be propelled in a direction away from the fixed section 110. It should be noted that the shape memory alloy 130 from the martensite phase to the austenite phase may be transformed by heating.

According to the propelling device 100 in the present embodiment, the propelling section 120 is not propelled unless the shape memory alloy 130 is heated by a heater and the like and it is thus possible to provide the propelling device 100 that is excellent in safety during storage and securely propels the propelling section 120 during operation.

It should be noted that the shape memory alloy 130 is preferably a single crystal shape memory alloy and more preferably a Cu—Al—Ni single crystal shape memory alloy. Use of such a single crystal shape memory alloy or a Cu—Al—Ni single crystal shape memory alloy allows storage of more strain energy and an increase in a propelling rate of the propelling section 120.

Examples

Figure 4:
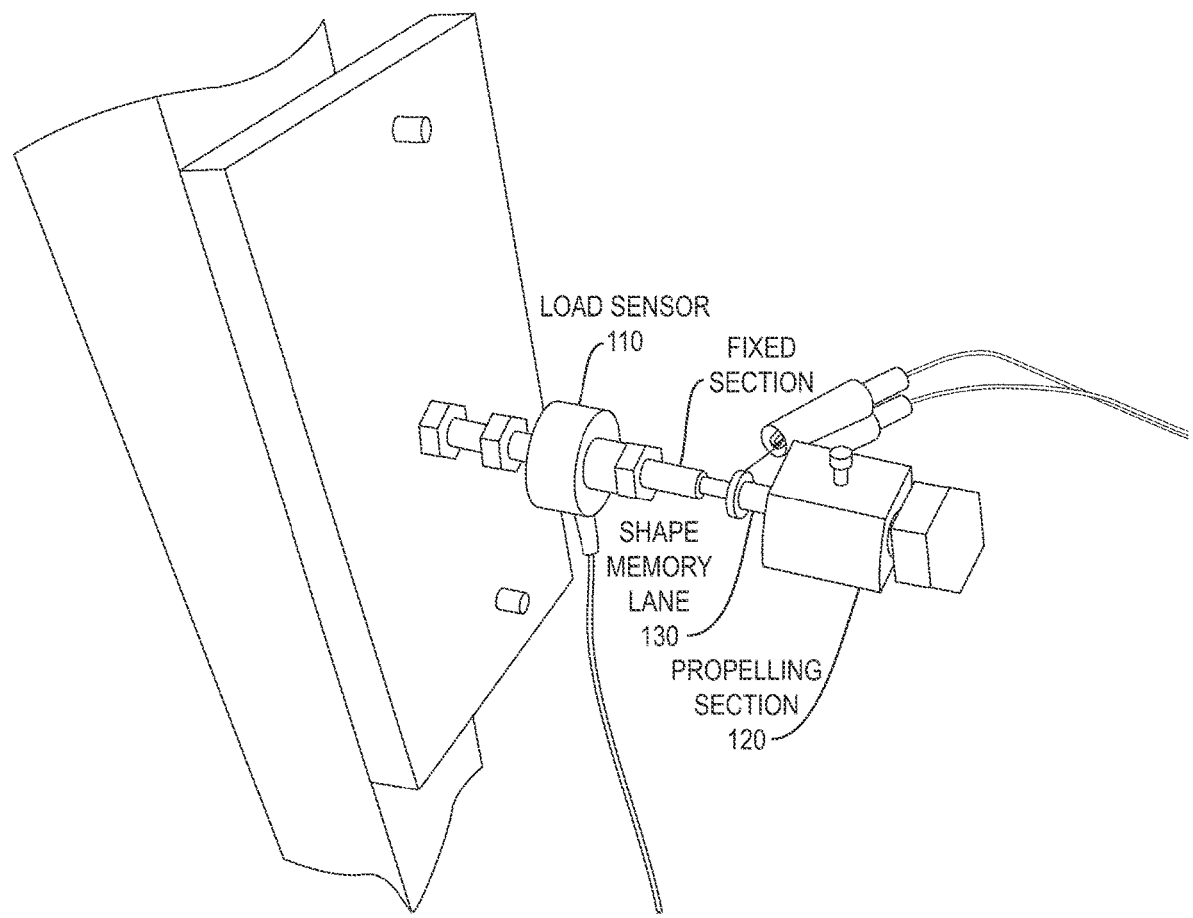
FIG. 4 is a photograph of an experimental device for propellant experiment of a propelling section 120.

FIG. 4 is a photograph of an experimental device for propellant experiment of the propelling section 120. The fixed section 110 was fixed to a base via a load sensor, and a heater arranged near the shape memory alloy 130 was turned on to heat the shape memory alloy 130. The heated shape memory alloy 130 was transformed to the austenite phase to release the strain energy, and as a result, the notched portion 146 of the notched bolt as the coupling member 140 was broken to cause the propelling section 120 to be propelled in the right direction of FIG. 4.

Figure 5:
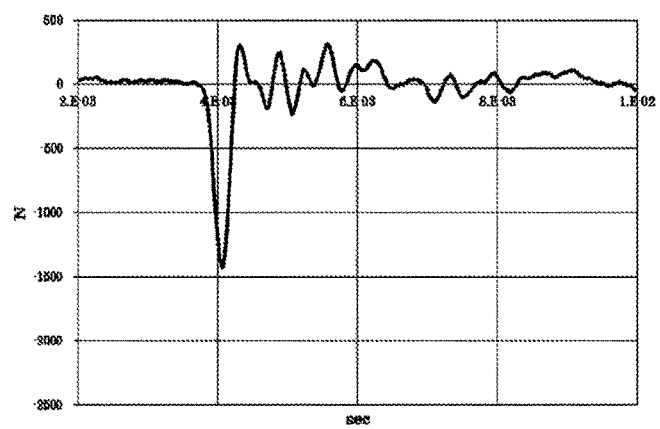
FIG. 5 is a graph of a reaction force during propellant measured with a load sensor.

FIG. 5 is a graph of a reaction force during propellant measured with the load sensor. A large reaction force measured at 4E−03 sec (4 msec) is assumed to indicate the moment of breaking the notched bolt and propelling the propelling section 120.

Three kinds of experiment (Experimental Examples 1 through 3) were performed by varying the length of the shape memory alloy. In the respective experiment of Experimental Examples 1 through 3, the maximum reaction force, the impulse, the electric energy, and the propelling rate were measured. The propelling rate was calculated from measurement by camera imaging or the angle of a hanging strap. In the respective experiment, the measurement was performed three times and the average was defined as the result of measurement.

The results are shown in Table 1. In Experimental Example 3, the weight of the propelling section was so heavy as 275 g, and thus the propelling rate is indicated by converting to the case of the weight of the propelling section of 110 g same as the other Experimental Examples (the value in the parentheses is the actually measured value with the weight of the propelling section of 275 g).

TABLE 1

|  | Length of Shape Memory Alloy (mm) | Weight of Propelling Section (g) | Maximum Reaction Force (N) | Impulse (NmSEC) | Electric Energy (Ws) | Propelling Rate (m/s) |
| --- | --- | --- | --- | --- | --- | --- |
| Experimental Example 1 | 10 | 110 | 1443 | 343 | 630 | 2.9 |
| Experimental Example 2 | 20 | 110 | 2012 | 589 | 709 | 5.0 |
| Experimental Example 3 | 30 | 275 | 1837 | 1150 | 709 | 7.1 (4.5) |

As shown in Table 1, with the increase in the length of the shape memory alloy 130 as 10 mm, 20 mm, and 30 mm, the propelling rate increased and the indicated values were sufficiently large as 2.9, 5.0, and 7.1 m/s, respectively.

While the present invention has been described with reference to the embodiments, the technical scope of the present invention is not limited to the description of the above embodiments. Those skilled in the art clearly understand that various modifications and improvement may be made to the above embodiments. It is also clearly understood from the scope of the appended claims that the embodiments processed with such a modification or improvement are also included in the technical scope of the present invention.

REFERENCE SIGNS LIST

100 Propelling Device
110 Fixed Section
120 Propelling Section
130 Shape Memory Alloy
140 Coupling Member
142 Head
144 Threaded Portion
146 Notched Portion

The invention claimed is:
1. A propelling device comprising:
a fixed section;
a propelling section;
a shape memory alloy having a cylindrical shape with a bush placed between the fixed section and the propelling section; and a coupling member coupling the fixed section, the propelling section, and the shape memory alloy with each other, wherein the coupling member is a notched bolt having a notched portion in an indent or recess shape, wherein the fixed section has an internal thread screwed to the notched bolt, wherein the notched bolt has a threaded portion screwed to the internal thread of the fixed section through the bush of the shape memory alloy, wherein the notched bolt has a head engaged with the propelling section, wherein the notched bolt is fastened to couple the fixed section, the propelling section, and the shape memory alloy with each other wherein the shape memory alloy is in a state of a compressed martensite phase, and wherein the shape memory alloy is transformed from the state of the martensite phase to a state of an austenite phase, causing strain energy to be stored, and action of the strain energy is used to break at least part of the coupling member and also impart a propelling force to the propelling section, and action of the propelling force causes the propelling section to be propelled in a direction away from the fixed section.

2. The propelling device according to claim 1, wherein the shape memory alloy is a single crystal shape memory alloy.

3. The propelling device according to claim 2, wherein the single crystal shape memory alloy is a Cu—Al—Ni single crystal shape memory alloy.

4. The propelling device according to claim 1, wherein the shape memory alloy is a single crystal shape memory alloy.

5. The propelling device according to claim 1, wherein the shape memory alloy is a single crystal shape memory alloy.

* * * * *